SINGLE AND DUAL SERVICE FITTINGS

Original Filed Oct. 14, 1968 4 Sheets-Sheet 1

INVENTORS.
CHARLES T. FLACHBARTH
ROBERT W. HADFIELD
WILLIAM H. HARDING
BY Frederick J. Olsson
ATTORNEY.

SINGLE AND DUAL SERVICE FITTINGS

Original Filed Oct. 14, 1968 4 Sheets-Sheet 2

INVENTORS.
CHARLES T. FLACHBARTH
ROBERT W. HADFIELD
WILLIAM H. HARDING
BY Frederick J Olsen
ATTORNEY.

SINGLE AND DUAL SERVICE FITTINGS
Original Filed Oct. 14, 1968 4 Sheets-Sheet 3
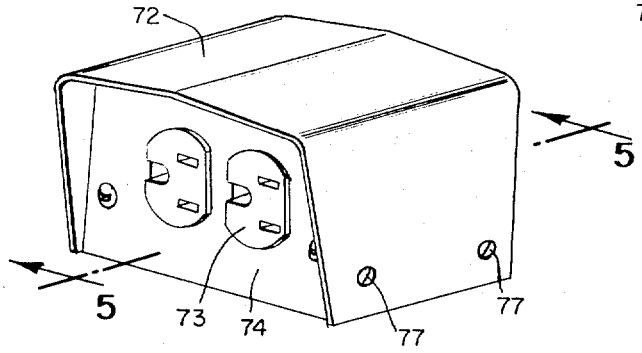
Fig. 4
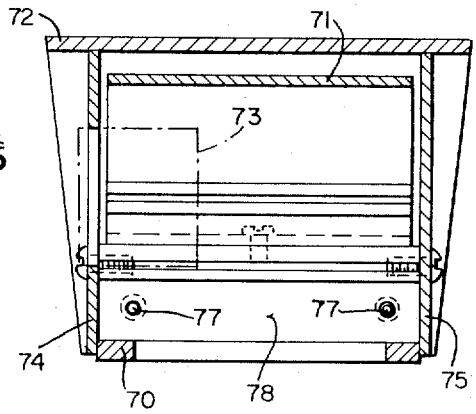
Fig. 5
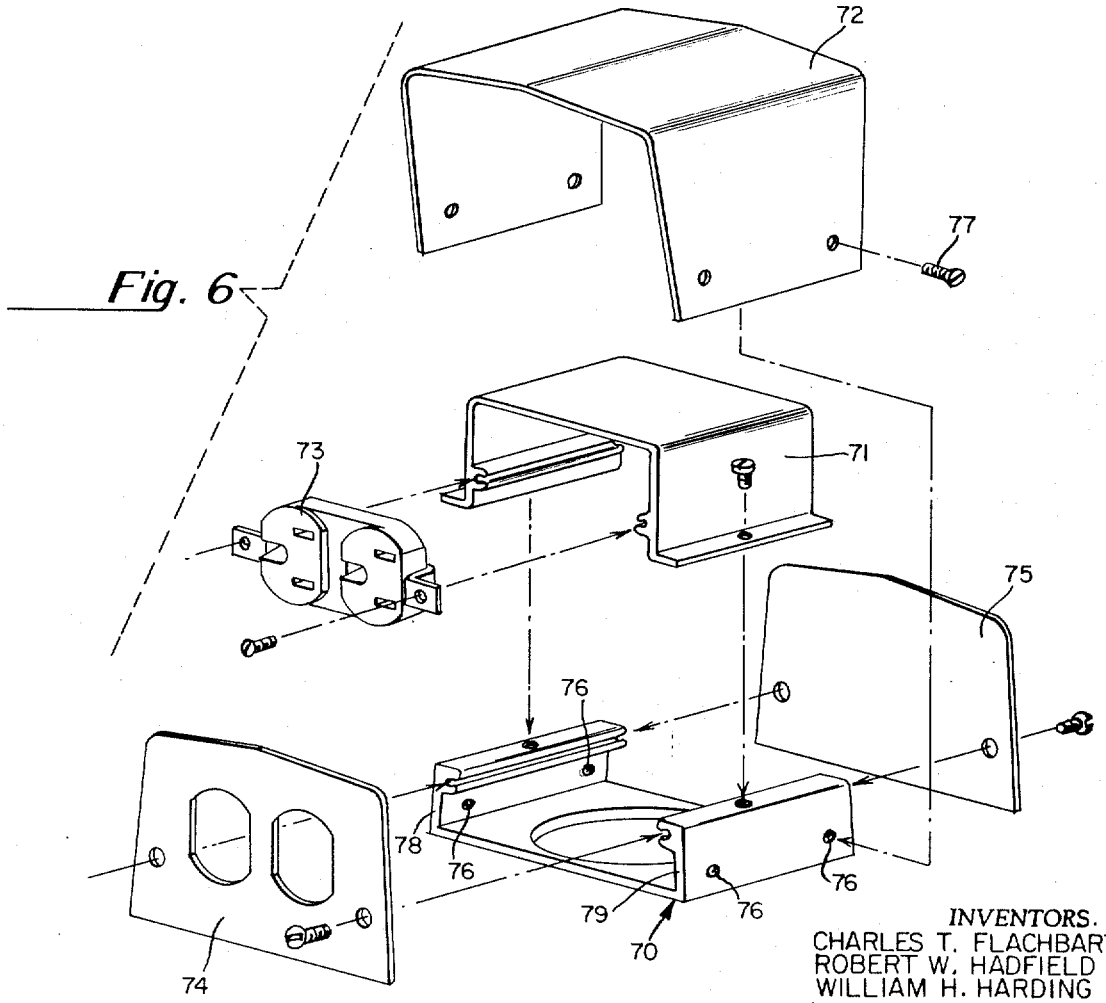
INVENTORS.
CHARLES T. FLACHBARTH
ROBERT W. HADFIELD
WILLIAM H. HARDING
BY Frederick J. Olson
ATTORNEY.

SINGLE AND DUAL SERVICE FITTINGS

Original Filed Oct. 14, 1968 4 Sheets-Sheet 4

INVENTORS.
CHARLES T. FLACHBARTH
ROBERT W. HADFIELD
WILLIAM H. HARDING

United States Patent Office

Re. 27,549
Reissued Jan. 16, 1973

27,549

SINGLE AND DUAL SERVICE FITTINGS

Charles T. Flachbarth, 7 Meadowcrest, Parkersburg, W. Va. 26101; Robert W. Hadfield, 1584 Lois, Belpre, Ohio 45714; and William H. Harding, 1337 25th St., Parkersburg, W. Va. 26101

Original No. 3,514,525, dated May 26, 1970, Ser. No. 767,300, Oct. 14, 1968. Application for reissue May 15, 1971, Ser. No. 153,299

Int. Cl. H02g *3/10*

U.S. Cl. 174—49 9 Claims

Matter enclosed in heavy brackets [ ] appears in the original patent but forms no part of this reissue specification; matter printed in italics indicates the additions made by reissue.

ABSTRACT OF THE DISCLOSURE

Service fittings for use with electrical underfloor distribution systems to provide for power and/or communication service connections, the fittings of the various types having basic components with corresponding structural characteristics which adapt the same to be fabricated by extrusion techniques and assembled together in the same manner.

This invention relates to electrical underfloor distribution systems and in particular relates to improvements in power and communication service fittings with use for such systems.

In one aspect the invention contemplates a family of single and dual purpose service fittings, the fittings having a marked similarity in outward appearance and inward uniformity of design of basic components.

In another aspect, the invention contemplates a family of single and dual purpose service fittings comprised of components of special cross sectional design which permits the corresponding components of the various fittings to be fabricated from the same extrusion die.

In another aspect, the invention contemplates a family of single and dual purpose service fittings comprised of components of special structural characteristics which provide for the corresponding components of the fittings to be fabricated from the same extrusion die and to be assembled and fitted to one another in the same manner.

In another aspect, the invention contemplates single and dual purpose service fittings comprised of components each having a cross sectional design permitting the same to be fabricated by first extruding a long blank and then severing the blank into sections, the length of a section depending upon the type of fitting with which the same is to be used.

With the above in mind, the preferred forms of the invention will be described below in connection with the following drawings wherein:

FIG. 4 is a prospective view of a fitting of the invention, particularly suitable for use as a power service outlet.

FIG. 5 is an elevational view in line 5—5 of FIG. 4.

FIG. 6 is an exploded view of the fitting of FIG. 4.

Figure 1:
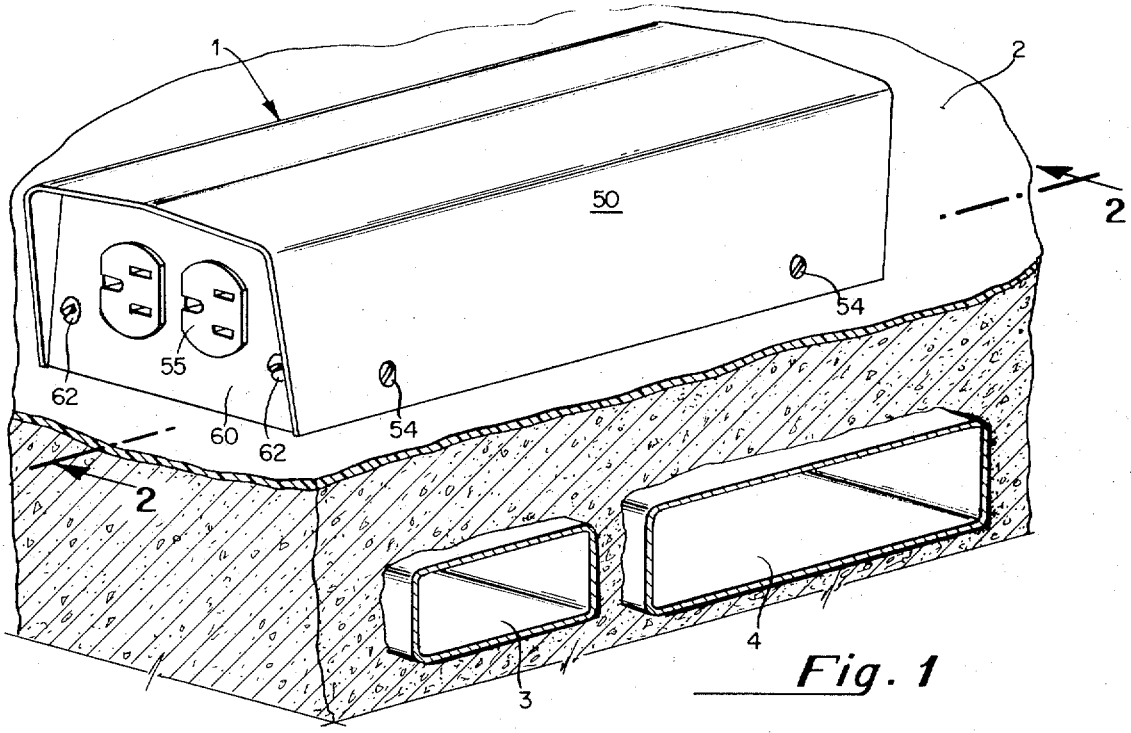
FIG. 1 is a prospective view showing a dual purpose fitting of the invention resting on a floor and in communication with underfloor ducts.

In FIG. 1 the dual purpose fitting 1 rests on the floor 2 and beneath the floor are the ducts 3 and 4 of the underfloor distribution system with which the fitting is used. The duct 3 is for containing power cables and the duct 4 is for containing communication cables.

Figure 3:
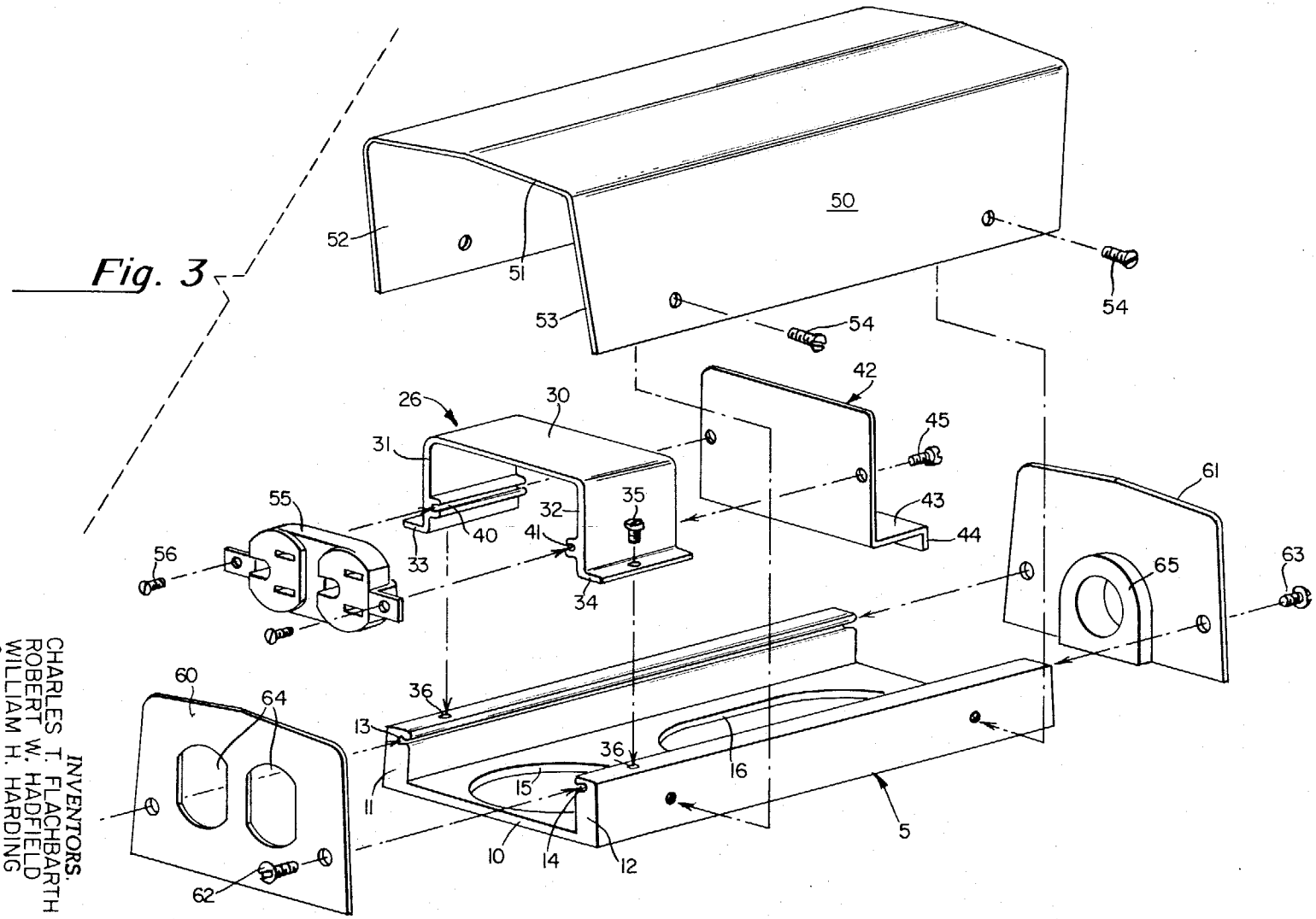
FIG. 3 is an exploded view of the components of FIG. 1.

The structure of the components comprising the fitting 1 is best illustrated in FIG. 3. The base plate 5 has a bottom section 10 which is adapted to rest on a floor such as the floor 2 and a pair of legs 11 and 12 are disposed on the opposite sides of the base and extend through the length of the base and project upwardly therefrom. The top portions of the legs 11 and 12 are respectively provided with grooves 13 and 14 which extend through the length of the base.

Figure 2:
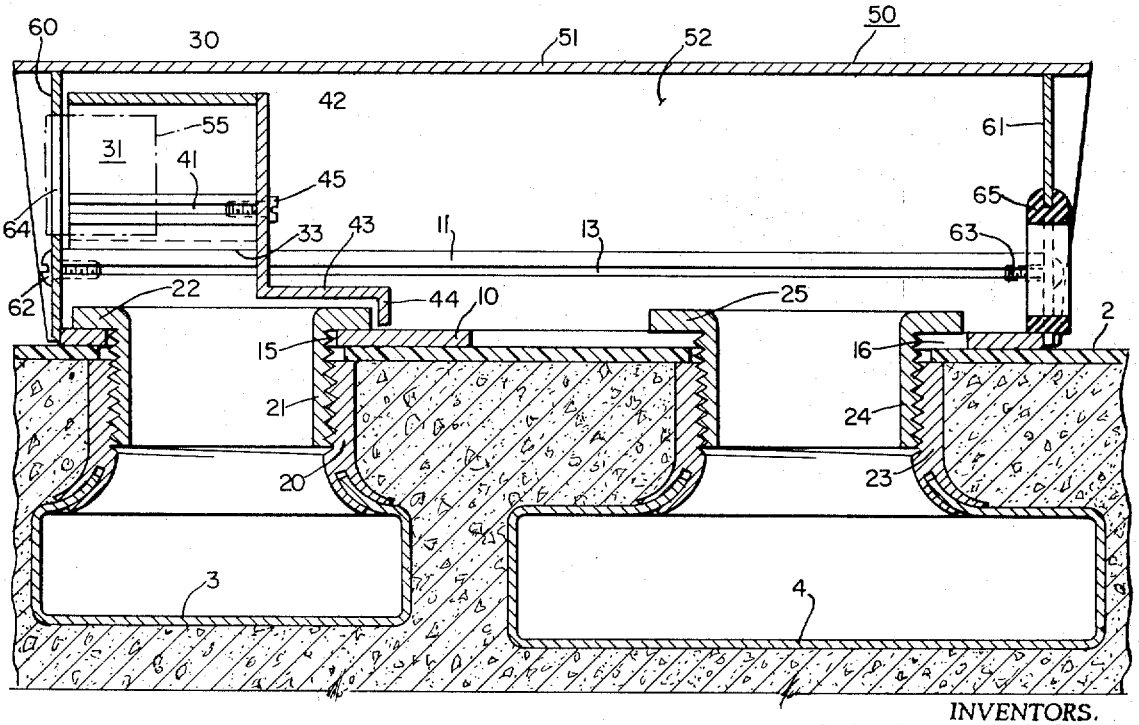
FIG. 2 is a cross sectional view taken on the line 2—2 of FIG. 1.

The bottom 10 has a pair of access openings 15 and 16 which communicate the inside of the fitting with the underfloor duct as is noted in FIG. 2.

In FIG. 2 the duct 3 has a threaded insert 20 mounting the threaded nipple 21 which extends upwardly through the access opening 15. The head 22 of the nipple bears against the bottom 10 of the fitting. The duct 4 has a threaded insert 23 carrying the nippple 24 which extends upwardly through the access opening 16. The head 25 of the nipple bears against the bottom 10. The access opening 10 is circular while the opening 16 is elongated. The shape of the access opening 16 is advantageous in that it accommodates the fitting to a wide variety of duct spacings.

As will be observed from the foregoing description the base 10 is structured so as to be U-shaped in cross section with the bottom 10, legs 11 and 12 and grooves 13 and 14 all extending generally parallel along the length of the base. With this construction the fitting is produced as by conventional extrusion techniques. In the extrusion process a long blank is extruded and this blank then is severed to make several sections of desired length. Subsequently, the access openings 15 and 16 are milled or punched and then certain other holes are drilled and tapped for the purpose of accommodating assembly screws (which will be explained later). The size of the grooves 13 and 14 is such that the same will accommodate self-tapping assembly screws as will be noted later.

The support 26 has a top section 30 which overlies or extends across the base 5 and a pair of legs 31 and 32 on opposite sides of the support which extend downwardly therefrom. Legs terminate in the feet 33 and 34 which respectively engage the top of the base legs 11 and 12. Locking screws in the feet 33 and 34 (see screws 35) are threaded in the tapped holes 36 in the base to secure the support in position.

Each of the support legs 31 and 32 has means forming the grooves 40 and 41 which extend along the length of the support. These grooves are adapted to receive self tapping assembly screws.

As will be apparent from the foregoing, the support 26 is U-shaped in cross section. The support is made by conventional extrusion techniques the same as the base 5. Preferably, a long support blank is extruded and this blank is cut up to make individual supports of the desired length.

A barrier 42 extends across one of the open ends of the support 26 and has a ledge 43 with a downwardly extending lip 44. As particularly noted in FIG. 2, the ledge 43 overlies the base widthwise and the lip 44 terminates closely adjacent the base in the area between the access holes 15 and 16. The barrier is held firmly to the support by the screws 45 which are threaded into the support grooves 40 and 41.

It will be observed that the barrier 42 is generally L-shaped in cross section and this structure lends itself for making the barrier as by extrusion techniques. A barrier blank is extruded to several feet in length and then the individual barriers are cut from the blank.

The housing 50 has a top section 51 overlying the support 26 and base 5. A pair of legs 52 and 53 are disposed on opposite sides of the top section and extend downwardly to respectively engage the outer surfaces of the base legs 11 and 12, the screws 54 which are threaded into the base legs 11 and 12 hold the housing in position.

The housing is U-shaped in cross section and is fabricated by extruding a long blank which is subsequently cut up to make housings of the desired length. The pieces cut from the blank are further processed by working the opposite ends to obtain the slanted condition as particularly noted in FIG. 2. Preferably, the external surface of the housing is then brushed to produce a matted effect.

At this point it is to be noted that extruding the housing rarely results in any surface imperfections which must be subsequently worked to remove the same as is the case with die-casting. With the latter type of operation it often happens that improper chilling causes surface imperfections such as swirls which require subsequent grinding and polishing of the housing surface to remove the same.

A power receptacle 55 extends between the legs of the support 26 and is secured to the fitting as by the screws 56 threaded into the grooves 40 and 41 which lock the receptacle against the support.

The opposite ends of the fitting have face plates 60 and 61 which extend across the open ends of the housing and engage the opposite edges of the base plate. The face plate 60 is secured as by the screws 62 and the face plate 61 is secured by the screws 63. The screws 62 and 63 thread into the grooves 13 and 14 in the base.

The face plate 61 has openings 64 which receive portions of the power receptacle 55 and the face plate 61 has a recess accommodating the grommet 65 which is adapted to receive telephone cables.

The face plates 60 and 61 are made from aluminum strip. A blank having the proper thickness and width is cut into sections which are subsequently worked to produce the desired shape and to form the receptacle, grommet and screw thread openings.

With respect to the support 26 the openings in the feet 33 and 34 which accommodate the screws 35 are preferably made over-size so that the support can be slightly moved back and forth on the base. The reason for this is that the receptacle mounting ears bear on the outside edge of the support and some lee-way is necessary in order that the face plate 60 can be locked up tight against the edge of the base.

With reference of the barrier 42, it will be seen particularly in FIG. 2 that the barrier divides the interior of the fitting with the two sections. One section (left hand side) being for the power connections and the other section (right hand side) being for communication connections. The barrier extends closely down against the base and closely adjacent to the top section and to legs of the housing. The barrier functions to isolate power wires or receptacles on the power side from communication wires or connectors on the communication side.

As mentioned heretofore, the various components are adaptable for use in a fitting providing single service such as power service. A fitting of this type is shown in FIGS. 4, 5 and 6.

With reference to these figures, it will be seen that the base 70, support 71, housing 72, receptacle 73 and face plates 74 and 75 are essentially identical in construction to the corresponding components described in connection with FIG. 3. The principal difference with respect to the base, support and housing being that the same are shorter than the corresponding components of FIG. 3. Also, with reference to the base 70 it will be noted that the legs 78 and 79 are thinner than the legs 11 and 12 of the base of FIG. 3. This construction is preferred inasmuch as there is a savings in material. The reason for the thick leg construction in the base of FIG. 3 is so that the ledge and lip of the barrier will set up closely against the base and housing and not leave a gap as would be the case if the construction of the base in FIG. 6 were used.

The face plate 75 is without an opening inasmuch as a single receptacle is used. When the fitting is to support two receptacles the plate 75 is replaced by a plate the same as 74.

In connection with securing the housing 72 to the base 70, the threaded holes 76 in the base receive the screws 76.

With respect to the support 71 it will be noted that the same extends substantially throughout the length of the base 70. The reason for this is that the support 70 partakes of the same dimensions of support 76 of FIG. 3. This reduces the inventory requirements.

Another reason for the structure of the support is that when two receptacles are used the additional receptacle can be mounted on the grooves in the support.

The base 70 is adapted to be connected to an insert of the underfloor system by a head and nipple, the same as nipple 21 in FIG. 2. In this instance, however, the head is arranged with locking screws as shown in copending application of William H. Harding, Ser. No. 658,840 filed Aug. 7, 1967.

Figure 7:
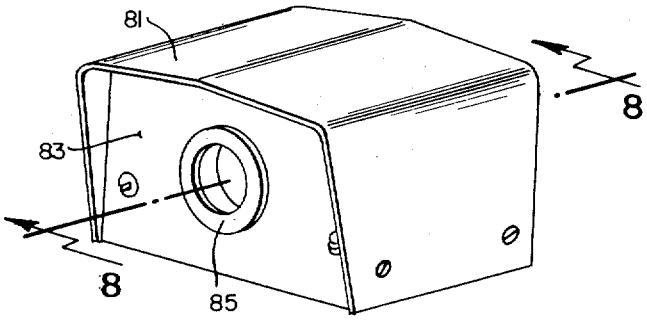
FIG. 7 is a prospective view of the fitting of the invention arranged for use as a telephone service outlet.
Figure 8:
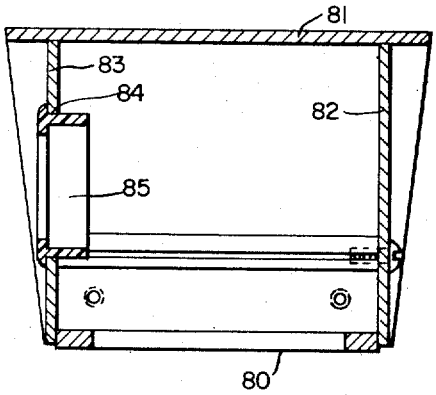
FIG. 8 is a view taken along the line 8—8 of FIG. 7.
Figure 9:
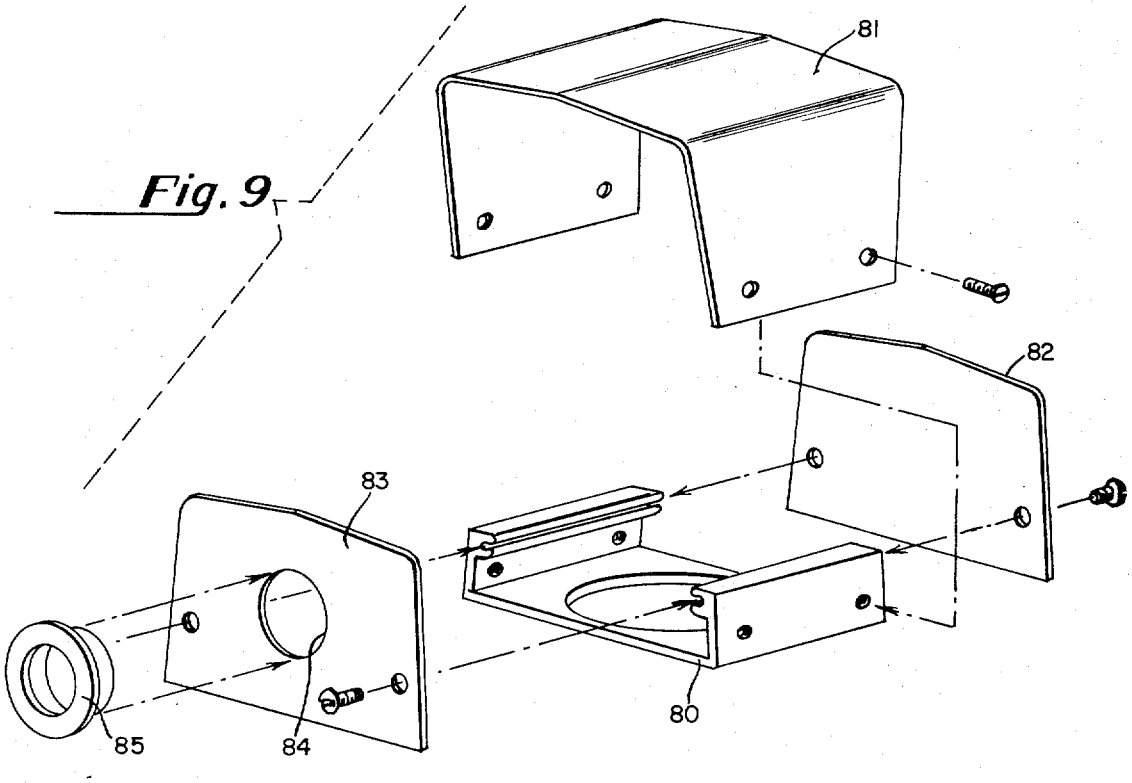
FIG. 9 is an exploded view of FIG. 7.

In FIGS. 7, 8 and 9, we have shown a fitting of which is adapted as a single service communication outlet.

The base 80 and cover 81 are identical to the base 70 and cover 72 of FIG. 6. The face plate 82 is the same as the face plate 75. The face plate 83 is modified in that it has an opening 84 receiving the grommet 85 which accommodates the exit of communication cables from the fitting. The base 80 is secured to the underfloor insert by a headed nipple as described in the aforementioned application 658,840.

Having described the structure of the various preferred forms of the fitting, it will be apparent to those skilled in the art that the design for each component is clean, relatively simple and straight forward. Also, it will be apparent that because of this design each of the fittings is assembled in substantially the same manner. In each type of fitting the base is placed on the floor and the power or communication wires are fished up through the access holes and the nipples put into place to hold down the base. The power receptacle and/or communication connectors are wired in. With the power and dual purpose types, the support is fastened down on the base and with the dual purpose type the barrier is then fastened to the support. Following this, in each of the types, the face plates are put into place on the base and the cover is then placed over the assembly and secured in position.

The common design characteristics of the various components described above and the similarity in assembly techniques lends itself to the production of a family of fittings, that is to say, fittings of different types having common internal and external design characteristics which is advantageous from the standpoint of production and marketing.

Furthermore, the concept of providing components for service fittings which have common structural characteristics so that corresponding components for the various types of fittings can be fabricated from the same extrusion die and assembled and fitted to one another in a like manner results in several important advantages.

First of all, with reference to FIGS. 1, 4 and 7 it will be noted that the family of fittings have a common external appearance, the principal difference being in the length of a fitting and (depending upon the point of observation) in the type of face plate. The design format is modern. This feature of common external design is advantageous in that numerous power, communication and dual service fittings can be spread around a large office layout and/or on several floors and with all of the fittings partaking of a pleasing uniformity in apperance which blends well with present day office decor.

Furthermore, the substantial identity of structure of the various components, the simplicity of design and the fact that the various fittings in the family are each assembled in substantially the same manner is advantageous because installation personnel can readily understand the manner of assembly and having assembled one type of fitting can quickly preceive how to assemble other fittings in the family.

Another advantage of the inventon is in the savings in tool costs as compared to tool costs for comparable fittings having die cast or stamped components. A single extrusion die can produce all of the various corresponding components for the family whereas in conventional die casting each type of fitting would require a separate and independent set of dies. Thus, the present invention results in substantial savings. For example, the cost of tools for die casting components of the kind described herein would run in the order of ten times the cost of extrusion tools.

Another important advantage of the design of the invention is in the savings in fabrication costs as compared to fabrication costs for comparable fittings having die cast or stamped components. The present design permits extrusion and minimizes the number of operations performed after the extrusion. In contrast, a base of the design illustrated made by conventional techniques would cost from about ten to twenty percent more than the cost of fabricating by the methods described herein.

Another important advantage of the invention is that it provides a great versatility in the range of application to various underfloor conditions and to changes in power and communication requirements. For example, in modernizing or remodeling older office buildings and particularly for up-dating the power and communication capacities, the fittings of the present invention can be custom mode so as to accommodate any particular spacing between the underfloor ducts and/or made to a length so as to accommodate longer and more complex telephone terminal boards.

We claim:

1. In an electrical underfloor distribution system, a service fitting to provide communication and/or power service connections, the fitting comprising:

an extruded, U-shaped base plate having a bottom section resting on the floor with which the system is used, an access opening in the bottom, a pair of legs respectively disposed on opposite sides of the bottom and projecting upwardly therefrom and each leg being provided with a groove extending therealong, each groove being adaptable to receive a face plate screw;

means in said access opening and bearing on said bottom for securing the base to the underfloor system;

an extruded, U-shaped open-ended housing having a top section overlying said base and a pair of legs on opposite sides of the top section and extending downwardly and respectively engaging the outer surfaces of the base legs;

screw means connecting the housing to said base legs;

a pair of face plates respectively extending across the open ends of said housing and engaging opposite edges of said base plate; and a pair of screws for each face plate respectively threaded into said grooves and securing the face plate against the base.

2. A construction in accordance with claim 1 wherein said screw means connecting the housing to the legs are spaced from one another in a direction as between said face plates.

3. A construction in accordance with claim 1 wherein one of said face plates has an opening provided with a grommet to receive a telephone cable.

4. A construction in accordance with claim 1 wherein one of said face plates is provided with at least one opening for receiving a portion of a receptacle.

5. In an electrical underfloor distribution system, a service fitting to provide power service connections, the fitting comprising:

an extruded, U-shaped base plate having a [bototm] *bottom* section resting on the floor with which the system is used, an access opening in the bottom, a pair of legs respectively disposed on opposite sides or the base and projecting upwardly therefrom and each of said legs having a groove extending therealong, each groove being adapted to receive a face plate screw;

means in said access opening and bearing on said bottom for securing the base to the underfloor system;

an extruded, U-shaped support having a top section overlying said base and a pair of legs on the opposite sides of the top section extending downwardly therefrom and respectively engaging the tops of said base legs, the lower section of each support leg having a groove extending therealong adapted to receive a receptacle screw;

screw means connecting said support to said base legs;

an extruded, U-shaped open-ended housing having a top section overlying said base and said support and a pair of legs on opposite sides of the top section extending downwardly and respectively engaging the outer surfaces of the base legs;

a power receptacle extending between the legs of said support;

a pair of screws respectively threaded into said support grooves and firmly holding the receptacle against the support;

a pair of face plates respectively extending across the open ends of said housing and engaging the opposite edges of said base plate, one of the face plates having an opening for receiving a portion of said receptacle; and a pair of screws for each face plate respectively threaded into the said base grooves and securing the face plate against the base.

6. A construction in accordance with claim 5 wherein said support legs each terminate in a foot and the feet respectively engage the tops of said base legs.

7. In an electrical underfloor distribution system, a service fitting to provide in a single unit both communication and power service connection, the fitting comprising:

an extruded, U-shaped base plate having a bottom resting on the floor with which the system is used, a pair of access openings in the bottom, one of the openings being circular and the other being elongated, a pair of legs respectively disposed on opposite sides of the base and projecting upwardly therefrom, and each leg having a groove extending therealong, each groove being adapted to receive a face plate screw;

means respectively in each said access opening and bearing on said bottom and securing the base to the [underflow] *underfloor* system;

an extruded, U-shaped open-ended support having a top section overlying said base and a pair of legs on opposite sides of the support extending downwardly therefrom and respectively engaging the tops of said base legs, the lower section of each support leg having a groove extending therealong adapted to receive receptacle screws;

screw means connecting said support to said base legs;

an extruded barrier extending across one of the open ends of said support and having a ledge overlying the base and terminating adjacent the base in the area between said access openings;

a pair of screws respectively threaded in said support grooves and firmly holding the barrier against the support, the barrier dividing the inside of the fitting into the two sections, one section being for power service connections and the other section being for communication service connections;

a power receptacle extending between the legs of said support;

a pair of screws respectively threaded into said support grooves and firmly holding the receptacle against the support;

an extruded, U-shaped open-ended housing having a top section overlying said support and said base and having a pair of legs on opposite sides of the top section and extending downwardly and respectively engaging the outer surfaces of said base legs;

screw means connecting the housing to said base legs;

a pair of face plates respectively extending across the open ends of said housing and engaging the opposite edges of said base plate, one of said face plates having an opening receiving a portion of said power receptacle and the other face plate being formed with an opening having a grommet for receiving a communication cable; and a pair of screw means for each plate respectively threaded into said [support] *base plate* grooves and securing the face plate against the base.

8. *In an electrical underfloor distribution system, a service fitting to provide in a single unit both communication and power service connections, the fitting comprising:*

*an extruded, U-shaped base plate having a bottom resting on the floor with which the system is used, access opening means in the bottom, a pair of legs respectively disposed on opposite sides of the base and projecting upwardly therefrom and each leg having a groove extending therealong, each groove being adapted to receive a face plate screw;*

*means for securing the base plate to the underfloor system;*

*an extruded U-shaped open-ended support having a top section overlying said base and a pair of legs on opposite sides of the support extending downwardly from the top section and respectively engaging the tops of said base legs, the lower section of each support leg having a groove extending therealong and adapted to receive screws;*

*screw means connecting said support to said base legs;*

*barrier means extending downwardly from the support and across one of the open ends of said support, the barrier means dividing the inside of the fitting into two sections, one section being for power service connections and the other section being for communications service connections;*

*a pair of screws respectively threaded in said support grooves and firmly holding the barrier against the support;*

*a power receptacle extending between the legs of said support;*

*a pair of screws respectively threaded into said support grooves and firmly holding the receptacle against the support;*

*an extruded U-shaped open-ended housing having a top section overlying said support and said base and having a pair of legs on opposite sides of the top section and extending downwardly and respectively engaging the outer surfaces of said base legs;*

*screw means connecting the housing to said base legs;*

*a pair of face plates respectively extending across the open ends of said housing and engaging the opposite edges of said base plates, one of said face plates having an opening receiving a portion of said power receptacle and the other face plate being formed with an opening having a grommet for receiving a communication cable; and*

*a pair of screws for each face plate respectively threaded into said base plate grooves and securing the face plates against the base.*

9. *In an electrical underfloor distribution system:*

*a floor and a pair of adjacent ducts imbedded in the floor, the ducts being respectively for containing power and communication cables;*

*insert means in the floor and connected with each said duct and providing a pair of openings available from the floor surface and respectively accommodating the passage of power and communication cable from the power and communication ducts;*

*an extruded U-shaped base plate having a bottom resting on the floor, access opening means in the bottom in communication with said pair of insert openings, a pair of legs respectively disposed on opposite sides of the base and projecting upwardly therefrom and each leg having a groove extending therealong, each groove being adapted to receive a face plate screw;*

*means securing said base to the insert means;*

*an extruded U-shaped open-ended support having a top section overlying the base and a pair of legs on opposite sides of the top and extending downwardly therefrom and respectively engaging the tops of said base legs, the lower section of each support leg having a groove extending therealong and adapted to receive screws;*

*screw means connecting said support to said base legs;*

*barrier means extending downwardly from the support and across one of the open-ends of said support, the barrier dividing the inside of the fitting into two sections, one section being for power service connections and the other section being for communication service connections;*

*a pair of screws respectively threaded in said support grooves and firmly holding the barrier against the support;*

*a power receptacle extending between the legs of said support;*

*a pair of screws respectively threaded into said support grooves and firmly holding the receptacle against the support;*

*an extruded U-shaped open-ended housing having a top section overlying said support and said base and having a pair of legs on opposite sides of the top section and extending downwardly and respectively engaging the outer surfaces of said base legs;*

*screw means connecting the housing to said base legs;*

*a pair of face plates respectively extending across the open ends of said housing and engaging the opposite edges of said base plate, one of said face plates having an opening receiving a portion of said power receptacle and the other face plate being formed with an opening having a grommet for receiving a communication cable; and*

*a pair of screw means for each plate respectively threaded into said base plate grooves and securing the face plates to the base.*

References Cited

The following references, cited by the Examiner, are of record in the patented file of this patent or the original patent.

UNITED STATES PATENTS

| | | | |
|---|---|---|---|
| 3,047,650 | 7/1962 | Reiland | 52—221 X |
| 3,083,857 | 4/1963 | Clark | 220—3.94 |
| 3,335,214 | 8/1967 | Brotherhood | 174—48 |
| 3,417,191 | 12/1968 | Fork | 174—49 |

LEWIS H. MYERS, Primary Examiner

D. A. TONE, Assistant Examiner